Oct. 10, 1950      R. C. CUNNINGHAM      2,525,479
ELECTRONIC MOTOR CONTROL SYSTEM
Filed Aug. 19, 1948      2 Sheets-Sheet 2
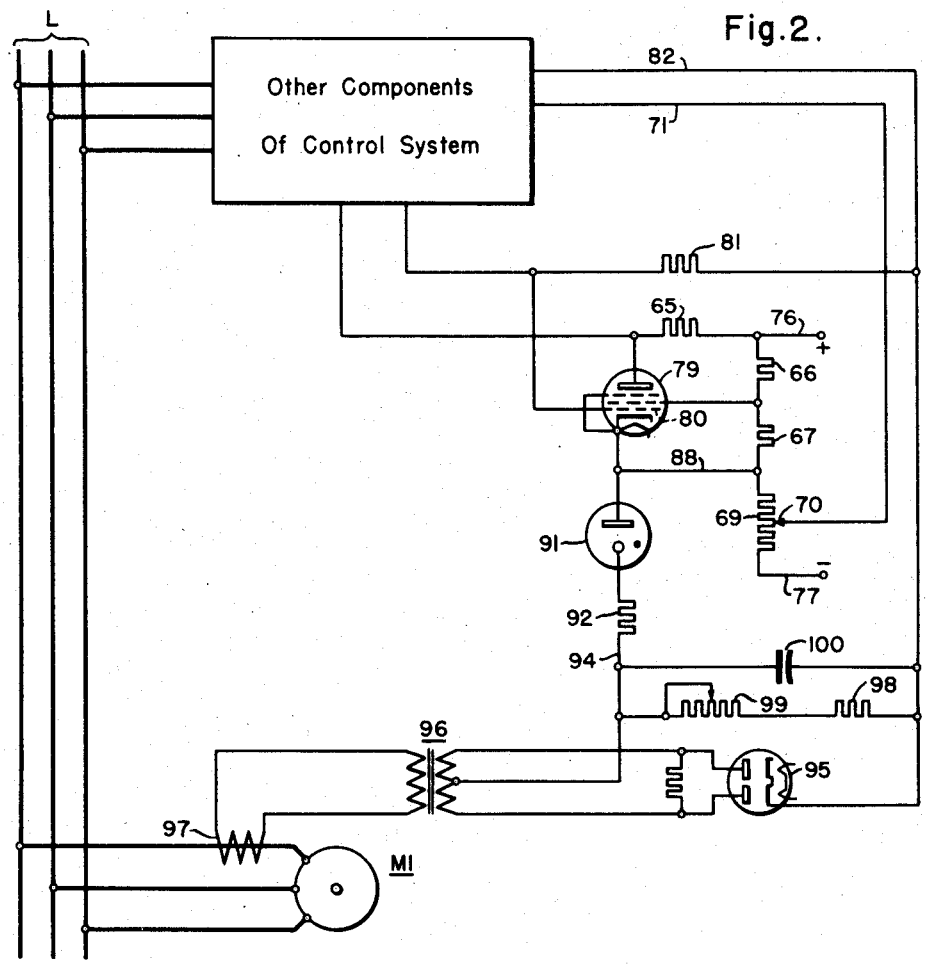
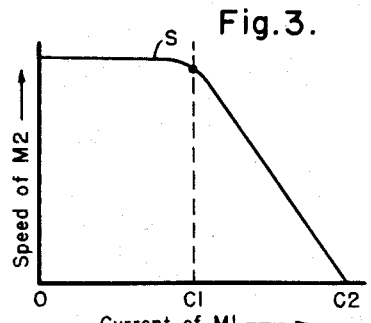
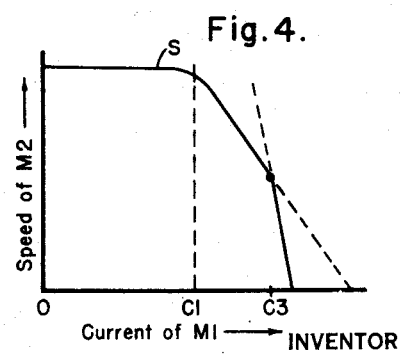
WITNESSES:
Robert C. Baird
James F. Young
INVENTOR
Richard C. Cunningham.
BY C. M. Avey
ATTORNEY Patented Oct. 10, 1950

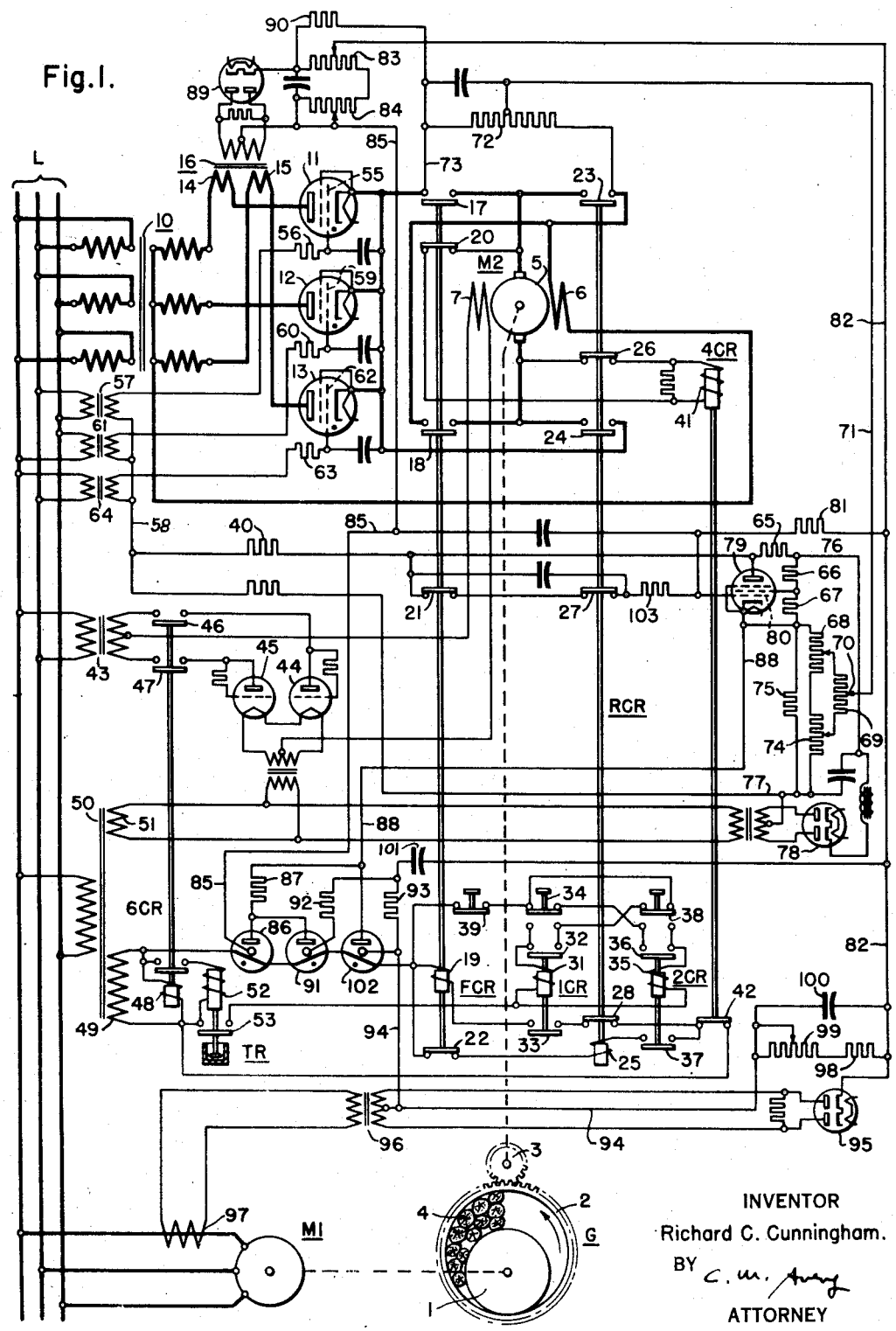

2,525,479

UNITED STATES PATENT OFFICE 2,525,479

ELECTRONIC MOTOR CONTROL SYSTEM

Richard C. Cunningham, Buffalo, N. Y., assignor to Westinghouse Electric Corporation, East Pittsburgh, Pa., a corporation of Pennsylvania Application August 19, 1948, Serial No. 45,047

5 Claims. (Cl. 318—39)

My invention relates to electronic systems for controlling an electric drive, particularly for controlling a direct-current motor energized through gaseous discharge devices from an alternating-current line.

It is an object of the invention to provide apparatus for controlling one motor in dependence upon an operating condition of another motor with the aid of relatively simple electronic control equipment that can readily and accurately be adjusted to respond only to the occurrence of a predetermined value of the controlling condition.

A more specific object of the invention is to provide an electronic system for controlling the feed motor of fabricating equipment in dependence upon the load condition of a correlated fabricating or tool drive motor so as to maintain the feeding or advancing speed of the material to be worked or fabricated within desired limits relative to the load on the fabricating or tool drive motor, or to maintain the load on the latter motor below desired limit values.

Referring, for instance, to the operating conditions of a drive for a pulp grinder, such a drive being shown on the drawing and described hereinafter, the fabricating or main motor drives a grinder wheel, and the logs to be ground are fed toward the rotating wheel by a log feed ring which is driven by a feed motor. Due to the non-uniformity of the logs the main motor is at times subjected to unusual loads. For example, when the feeding pressure is too high, the load on the main motor may be excessive; or when the grinder wheel encounters a hard region in a log, the main motor load may instantly rise to overload values. With reference to such pulp grinder drives, an object of my invention is to insure a normal feeding of the log material at the desired rate without overloading the main motor. It should be understood, however, that the invention is likewise applicable to other types of machinery and operating conditions.

Another object of the invention is to achieve the desired dependency of the feed drive upon a working or load condition of the main or tool drive by electronic control means associated with the same control circuit of the feed motor rectifier tubes that also provides a current-limit or acceleration control for the feed motor, thus providing an electronic control system of great overall simplicity and high reliability.

Other and more specific objects and advantages of the invention are apparent from the following.

While the features of my invention, which I consider to be novel and patentable are stated in the appertaining claims, they are more fully explained and specifically exemplified by the control systems illustrated on the drawing which shows in Fig. 1 the circuit diagram of a pulp grinder drive, and in Fig. 2 a modification of a portion of the same drive, while Figs. 3 and 4 are explanatory coordinate diagrams.

In order to present a complete example of a drive built in accordance with the invention, parenthetical references are given in the following to commercial tube designations and numerical values of circuit parameters with the understanding that these references are exemplary only and not intended to be preclusive.

Fig. 1 shows schematically a pulp grinder G which has a grinder wheel 1 driven by a main motor M1 and a feed ring 2 driven through a gearing 3 from a feed motor M2. Rotation of the ring 2 in the direction of the arrow moves the logs 4 toward the rotating grinder wheel 1.

The main motor M1 (3,000 H. P.) is energized from an alternating-current line L. The motor is normally equipped with the necessary starting and control devices, but since these are not essential to the invention, they are not illustrated in the drawing. For understanding this description, it may be assumed that the motor M1, when energized and in steady state operating conditions, is running at a substantially constant speed.

The armature of the feed motor M2 (7 to 10 H. P.) is denoted by 5. Motor M2 has a series field winding 6 which may consist of an interpole or compensating winding. The main field winding 7 of the motor is separately excited.

The armature circuit of the feed motor M2 is energized from the line L through a symbolically represented power transformer 10 and includes three gas discharge devices 11, 12, 13. These devices consist of thyratrons (type WL-414), although for other applications different types of control tubes are applicable, such as ignitrons for controlling motors of larger power. The armature circuit also includes the primary windings 14 and 15 of a current transformer 16 whose purpose and functioning will be explained in a later place. The armature circuit is controlled by two reversing contactors FCR and RCR which connect the armature to the tubes with the polarities needed for forward and reverse operation, respectively.

The main contacts 17 and 18 of contactor FCR are controlled by a coil 19 which actuates also three auxiliary contacts 20, 21, 22. Contactor RCR has main contacts 23 and 24 controlled by a coil 25 which also actuates auxiliary contacts 26, 27 and 28.

The coil circuit for contactor FCR is controlled by a relay ICR whose coil 31 actuates two contacts 32 and 33 and is energized under control by a "forward" contact 34, for instance, of the push button type. Similarly, the coil circuit for contactor RCR is under control by a relay 2CR whose coil 35 actuates two contacts 36, 37 and is energized through a "reverse" contact 38, preferably also of the push button type. Series connected with contacts 34 and 38 is a normally closed "stop" contact 39.

Connected across the armature 5 of motor M2 is the coil 41 of a relay 4CR in series with the above-mentioned contacts 20 and 26. The contact 42 of relay 4CR controls the coil circuits for relays FCR and RCR. Relay 4CR picks up when contactors FCR and RCR are both dropped out and when at that time the motor M2 is still running at a speed above a given minimum value at which the voltage across coil 41 of relay 4CR exceeds its pickup value. Consequently, the armature circuit of motor M2 can be closed only when the motor M2 is substantially at rest.

Assuming the supply line L to be energized and the main motor M1 to be running, the feed motor M2 is started by temporarily depressing the "forward" contact 34. This causes relay ICR to pick up and to seal itself in through contact 32. Relay ICR closes, at contact 33, the circuit for coil 19 of contactor FCR which then closes its main contacts 17 and 18 and thus completes the armature circuit of motor M2 for operation in the forward direction. Thereafter, motor M2 can be stopped by actuating the "stop" contact 39. Actuation of the "reverse" contact 38 causes relay 2CR and contactor RCR to pick up for closing the armature circuit of motor M2 when the motor is to operate in the reverse direction.

During the operation of the feed motor M2, its main field winding 7 receives constant excitation from the line L through a transformer 43 and two full-wave connected rectifier tubes 44 and 45 under control by the contacts 46 and 47 of a relay 6CR. The coil 48 of relay 6CR is energized from the secondary winding 49 of a transformer 50 so that relay 6CR is picked up whenever the supply line L is properly energized. The transformer 50 has another secondary winding 51 which provides cathode heating current for the field rectifier tubes 44 and 45.

Connected across the transformer winding 49, under control by relay 6CR, is the coil 52 of a timing relay TR whose contact 53, when closed, energizes the coil circuits of the above-mentioned relays ICR, 2CR and contactors FCR, RCR. Since the contact 53 closes a timed interval subsequent to the closing of relay contacts 46 and 47, the armature circuit of the feed motor M2 can be energized only after full excitation is applied to the field winding 7.

Another time delay relay (not shown) is customarily inserted between coil 48 of relay 6CR and the transformer winding 49 so that the application of high voltage to tubes 44 and 45 is held off until the cathodes of the tubes have had time to warm up.

A magnitude of rectified armature current supplied to the feed motor M2 depends upon the firing angle of the armature rectifier tubes 11, 12, 13, i. e., on the phase position of the ignition moments relative to the cycle period of the tube anode voltage. The firing angle is controlled by the voltage conditions of the rectifier control circuit. The control grid 55 of the tube 11 is connected through a resistor 56 (220,000 ohms) and a phase shift transformer 57 to a lead 58. The control grid 59 of tube 12 is connected through a resistor 60 (220,000 ohms) and a phase shift transformer 61 to the same lead 58. The control grid 62 of the tube 13 is connected through a resistor 63 (220,000 ohms) and a phase shift transformer 64 also to the lead 58. The phase shift transformers 57, 61 and 64 impress on the respective grids an alternating bias of a given phase displacement, for instance about 90° phase lag, relative to the respective anode voltages of tubes 11, 12 and 13. It will be understood that the phase shift transformers may be combined or connected with the main power transformer 10, and that, if desired, other designs of phase shift devices may be used to provide the armature rectifier tubes with dephased grid bias. Also the design and arrangement of the other transformers is more or less arbitrary and not essential to the invention proper.

Reverting to the control circuit for the armature rectifier tubes 11, 12 and 13, it will be noted that the above-mentioned common lead 58 is connected in series with resistor 40 (100,000 ohms), a resistor 65 (10,000 ohms), a resistor 66 (2,500 ohms), a resistor 67 (1,000 ohms), a tapped portion of a potentiometric rheostat 68 (1,900 ohms total resistance), and a tapped portion of a potentiometric rheostat 69 (7,500 ohms total resistance). From the displaceable slider or tap 70 of rheostat 69, the control circuit extends through a lead 71 and a potentiometric resistor 72 (15,000 ohms total resistance) to a common cathode lead 73 of the rectifier tubes 11, 12 and 13.

The control circuit of the armature rectifiers just traced can be analyzed to include two sources of control voltage in addition to the above-mentioned phase shift transformers or source of dephased alternating bias voltage. One of the additional voltage sources for the control circuit comprises the resistors 66, 67 and rheostats 68, 69. These resistors and rheostats form part of a voltage divider which includes also a rheostat 74 (14,700 ohms total resistance) and a resistor 75 (3,000 ohms). The terminal leads 76 and 77 of this voltage dividing resistance arrangement are energized from a direct-current source of constant voltage which includes a twin rectifier tube 78 (type 5Y4-G) energized from the secondary winding 51 of transformer 50. The voltage impressed by the voltage source across the resistors 66, 67 and the adjusted portion of rheostat 68 is constant. The voltage drop across the adjacent portion of rheostat 69 may vary because the slider 70 of this rheostat is to be displaced for speed control purposes. However, the voltage drop across rheostat 69 is small compared with the total drop across resistors 66 and 67 so that such variations are negligible as regards the control of the armature rectifier tubes. Consequently, the component control voltage impressed on the rectifier control circuit from the potentiometric resistance circuit as a whole is substantially constant and combines with the above-mentioned dephased alternating bias voltage to a periodic bias voltage synchronous with the rectifier anode voltage.

The second additional source of control voltage for the control circuit of the armature rectifiers is represented by the resistor 65. This resistor is connected as a series load in the plate circuit of an amplifying master control tube 79 (6Y6-G). Tube 79 receives plate excitation from across the voltage divider resistors 66 and 67. That is, the constant voltage source, including the rectifier tube 78, serves also to supply the plate energization of tube 79. The amount of current flowing in the plate circuit of tube 79 and, consequently, the voltage impressed across the load resistor 65 depend upon the voltage conditions of the master tube grid circuit.

This grid circuit is branched. Its main branch extends from the control grid 80 of the master tube 79 through a resistor 81 (10,000 ohms), a lead 82, a portion of a rheostat 83 (400 ohms total resistance), a resistor 90 (220,000 ohms), a portion of the tapped resistor 72 and lead 71 to the displaceable tap 70 of the speed-control rheostat 69, thence through rheostat 68 to the cathode lead 88 of the master tube. The bias voltage impressed by this main grid circuit branch between the cathode and control grid of the master tube is essentially determined by the adjusted voltage drop across the active portions of rheostats 68 and 69 and dependent upon the selected setting of the control tap or slider 70. The desired base speed of the feed motor can, therefore, be adjusted by setting the slider 70, the maximum and minimum values of the available range of base speeds being determined by the tap adjustment of rheostats 68 and 74.

Another branch of the master tube grid circuit extends from lead 82 through rheostat 83, a portion of a rheostat 84 (5,000 ohms total resistance) to a lead 85. Lead 85 is connected to the cathode of a cold-cathode tube 86 of the voltage regulating type (OD3). From the anode of tube 86 the grid circuit branch extends through a resistor 87 (68,000 ohms) to the cathode lead 88 of the master tube 79.

The just-mentioned grid circuit branch is impressed by variable unidirectional voltage from across the tapped portions of rheostats 83 and 84 which are series connected across the output leads of a rectifier tube 89 (6X5-GT). The circuit of tube 89 is energized from the above-mentioned current transformer 16. The voltage impressed by rheostats 83 and 84 on the master tube grid circuit is substantially proportional to the armature current of the feed motor M2. Part of this voltage is effective across the cold-cathode tube 86. As long as the voltage across tube 86 remains below the breakdown value, there is no current flow through this circuit branch. Consequently, up to a selected value of armature current, adjusted by the chosen setting of rheostats 83 and 84, this grid circuit branch has no effect on the speed controlling functioning of the master tube. However, when the armature current of the feed motor M2 exceeds a value at which the tube 86 becomes conductive, the master tube is impressed by grid voltage so as to increase its conductance. An increased voltage drop then appears across the load resistor 65 so that the firing points of the armature rectifier tubes 11, 12, 13 are delayed, thus reducing the armature current of the feed motor. The above-mentioned voltage adjustments in the master tube grid circuit are such that the current limiting effect does not occur during steady state operation of the feed motor, but takes place only when the armature current exceeds a predetermined overload value as occurring, for instance, during the starting and accelerating periods of the feed motor. The master tube is then effective to control the acceleration of the feed motor. The same limiting effect, of course, also occurs if a high overload appears in the armature circuit due to an excessive torque on the feed motor as may be caused by a defect in the machinery or by blocking of the log feed ring.

A third branch of the master tube grid circuit extends through a cold-cathode tube 91 of the voltage regulating type (OC3/VR105). Tube 91 has its anode connected to that of tube 86. The cathode of tube 91 is connected through a resistor 92 (22,000 ohms) and a resistor 93 (68,000 ohms) to an output lead 94 of a rectifier which includes a rectifying tube 95 (6X5-GT) energized through a step-up transformer 96 from a current transformer 97 which is inductively linked with the energizing circuit of the main motor M1. The rectified voltage of tube 95 is impressed across a voltage divider composed of a resistor 98 (4,700 ohms) and a rheostat 99 (7,500 ohms) paralleled by a filtering capacitor 100 (2 mfd.). The above-mentioned output lead 94 is connected to one end of the voltage dividing resistors while the other output lead is identical with the above-mentioned lead 82. The regulating tube 102 (OD3/VR150) is associated with the master tube grid circuit and with the output circuit of the rectifier 95. The tube 102 has a higher breakdown voltage (150 volts) than the tube 91 (105 volts) and has the effect, when conductive, of biasing the master tube to control the armature rectifiers more strongly toward cut-off or to complete cut-off. In this manner, the circuit of tube 102 provides a peak limiting action and prevents pull-out of the main motor. Under the voltage ratings given in parentheses, the limiting action of tube 102 is held off until the main motor load reaches approximately 150% of that at which the current regulation by tube 91 begins; and the amplification through the grid circuit branch active when tube 102 conducts is high enough to cause complete cut-off of power to the feed motor.

Reverting to the above-described tube 91 and the associated circuits, it should be understood that the time delay or cushioning effect of capacitor 101 and resistor 93 is needed or desirable only under special conditions of loading or under combinations of regulating means and loads which show instability without the introduction of a time delay. Hence, there are applications where the time delay circuit is not needed. As a matter of fact, the tube 102 is so connected that the time delay circuit is by-passed whenever the main motor load increases suddenly to an excessive level at which the tube 102 becomes conductive. It will further be apparent that, for applications where the main motor load changes are less severe than assumed for the embodiment of Fig. 1, the peak limit tube 102 and appertaining circuit connections need not be provided so that then the speed regulation of the feed motor in response to the main motor load is effected only by the tube 91.

The modified system shown in Fig. 2 serves to elucidate the changes mentioned in the preceding paragraph. The components illustrated in Fig. 2 represent substantially only the modified portion of the system, the rest being assumed to be similar to the corresponding portions of Fig. 1. The reference characters in Fig. 2 are identical with those denoting respectively similar elements in Fig. 1. The modified system differs from that of Fig. 1 substantially only by the elimination of the time delay members 93 and 101, and by the elimination of tubes 86 and 102. Hence, only the tube 91 is effective in the system of Fig. 2 to control the feeding speed in response to current feedback from the main motor.

The regulating performance of a system equipped with only one feedback controlled tube (tube 91), for instance as shown in Fig. 2, will be more fully understood from the coordinate diagram shown in Fig. 3.

In Fig. 3, the abscissa represents the armature current of the main motor M1. The ordinate represents the speed in R. P. M. of the feed motor M2. Up to a predetermined current C1 of the main motor, the feed motor runs at the maximum speed adjusted at the speed control rheostat 69. When the main motor current exceeds the value C1, the regulating tube 91 becomes conductive and causes the master tube 79 to reduce the speed. Consequently, the speed curve S of the feed motor drops gradually until the feed motor stops. Thus the load current of the main motor is limited to a maximum value C2. The current range between zero and C1 of the main motor can be adjusted by means of the rheostat 99. Therefore, the rheostat 99 is preferably located at the operator's station together with the speed control rheostat 69. The control range between current values C1 and C2 in which the feedback from the main motor is effective to reduce the speed of the feed motor depends upon the parameters of the circuit for tube 91 and hence can also be adjusted within limits by a proper selection of the voltage and impedance values in that circuit.

When the system is also equipped with a peak limit tube, as represented by tube 102 in Fig. 1, the performance is similar to that schematically represented in the diagram of Fig. 4. When the current of the main motor M1 remains below the value C1, the feed motor M2 runs at the maximum speed determined by the selected adjustment of rheostat 69. When the main motor current exceeds the value C1, the speed curve S drops gradually from the maximum speed in accordance with the diagram of Fig. 2. However, when the main motor current exceeds the value C3, the speed curve S follows the control characteristic of the now conductive circuit of tube 102 and drops more rapidly to zero speed.

The control of one motor in response to the input to another motor in accordance with the invention has many diverse applications for various machine tools and other fabricating equipment involving separate feed and main drives. Also, certain processes involving several motors on successive conveyors, rolls, and the like can be regulated by such a system. Of course, it is only a matter of reversing polarities to "invert" the system described above to cause the regulated motor to increase in speed with increase in input to the controlling motor, thus providing another group of suitable applications.

It will be obvious to those skilled in the art after a study of this disclosure, that systems according to the invention permit various modifications other than those set forth in the foregoing without departing from the objects and essence of the invention and within the scope of the claims annexed hereto.

I claim as my invention:

1. Apparatus for controlling one motor in dependence upon an operating condition of another motor, comprising an energizing circuit having alternating-current supply means and a discharge rectifier to provide current for said one motor, said rectifier having a control circuit with adjustable voltage means, means for controlling said current in accordance with a desired normal motor speed, variable-voltage supply means responsive to said operating condition of said other motor, a first cold-cathode tube of a given breakdown voltage having a tube circuit attached to said variable-voltage supply means to be conductive when said condition exceeds a predetermined first value and coupled with said control circuit for causing said control circuit to reduce said current when said tube is conductive, and a second cold-cathode tube of a given breakdown voltage higher than that of said first tube, said second tube being connected with said variable-voltage supply means to be conductive when said condition exceeds a predetermined second value higher than said first value and being coupled with said control circuit for additionally reducing said current when conductive.

2. Apparatus for controlling one motor in dependence upon an operating condition of another motor, comprising an energizing circuit having alternating-current supply means and a discharge rectifier to provide current for said one motor, said rectifier having a control circuit with adjustable voltage means, means for controlling said current in accordance with a desired normal motor speed, variable-voltage supply means responsive to said operating condition of said other motor, an electronic tube of a given breakdown voltage coupled with said control circuit for causing, when conductive, said control circuit to vary said current, a time delay circuit connecting said tube with said variable-voltage supply means for rendering said tube conductive when said condition exceeds a predetermined value for a given period of time.

3. Apparatus for controlling the speed of a feed motor in dependence upon the load current of an appertaining tool-operating motor, comprising a feed motor circuit having a discharge device with a control circuit for controlling the feed motor speed, an electronic amplifier having an output circuit coupled with said control circuit to provide control voltage therefor and having a grid circuit for controlling said voltage, adjustable grid voltage means disposed in said grid circuit for determining the desired feed motor speed, current-responsive voltage supply means for connection with said tool-operating motor, a first electronic tube of a given breakdown voltage having a circuit connected with said voltage supply means and coupled with said control circuit for causing the latter to reduce said speed when said load current exceeds a given first value at which said first tube becomes conductive, a second electronic tube of a given breakdown voltage also connected to said voltage supply means to become conductive when said current exceeds a second value higher than said first value, said second tube being connected with said grid circuit for causing the latter to bias said rectifier substantially to cut-off when said second tube is conductive.

4. Apparatus for controlling the speed of a feed motor in dependence upon the load current of an appertaining tool-operating motor, comprising a feed motor circuit for controlling the feed motor speed, an electronic amplifier having an output circuit coupled with said control circuit to provide control voltage therefor and having a grid circuit for controlling said voltage, adjustable grid voltage means disposed in said grid circuit for determining the desired feed motor speed, current-responsive voltage supply means for connection with said tool-operating motor, a first voltage regulating tube of a given breakdown voltage, a time delay circuit connecting said first tube with said voltage supply means for rendering said tube conductive when said current exceeds a predetermined first value of a period of time determined by said delay circuit, said first tube being coupled with said grid circuit for causing it to reduce said speed when said first tube is conductive, a second voltage regulating tube coupled with said grid circuit and connected with said voltage supply means around said time delay circuit for biasing said grid circuit to rapidly reduce said speed when said second tube is conductive.

5. Apparatus for controlling the speed of feed motor in dependence upon the load current of an appertaining tool-operating motor, comprising a feed motor circuit having a discharge device with a control circuit for controlling the feed motor speed, an electronic amplifier having an output circuit coupled with said control circuit to provide control voltage therefor and having a grid circuit for controlling said voltage, said grid circuit having three parallel branches of which one is permanently closed during motor operation and contains adjustable grid voltage supply means for determining the normal feed motor speed, a first current-responsive voltage source connected with said feed motor circuit, a cold-cathode tube connected with said first source to be conductive only when the feed motor current exceeds a given value and disposed in another one of said grid circuit branches for causing, when conductive, said grid circuit to reduce the feed motor current, a second current-responsive voltage source for connection with said tool-operating motor, a cold-cathode tube having a circuit connected with said second source to become conductive when said load current exceeds a predetermined overload value and disposed in the third branch for causing said grid circuit to reduce said feed motor current when said latter tube is conductive.

RICHARD C. CUNNINGHAM.

REFERENCES CITED

The following references are of record in the file of this patent:

UNITED STATES PATENTS

| Number | Name | Date |
|---|---|---|
| 1,801,657 | Buyko | Apr. 21, 1931 |
| 2,071,984 | Minneci | Feb. 23, 1937 |
| 2,411,162 | King | Nov. 19, 1946 |